United States Patent [19]

Tabuchi et al.

[11] 4,226,629

[45] Oct. 7, 1980

[54] ELECTROFUSION METHOD OF PRODUCING BORON ALUMINUM OXIDE REFRACTORY

[75] Inventors: Heizi Tabuchi; Toshiaki Itoh, both of Matsusaka, Japan

[73] Assignee: Central Glass Company, Limited, Ube, Japan

[21] Appl. No.: 37,010

[22] Filed: May 8, 1979

Related U.S. Application Data

[63] Continuation-in-part of Ser. No. 886,109, Mar. 13, 1978, abandoned.

[51] Int. Cl.$^2$ ............................................. C04B 35/10
[52] U.S. Cl. ..................................... 106/65; 423/279
[58] Field of Search ................. 106/65, 73.4; 423/279

[56] References Cited

U.S. PATENT DOCUMENTS 2,118,143   5/1938   Benner et al. .......................... 106/65

*Primary Examiner*—James Poer
*Attorney, Agent, or Firm*—Fleit & Jacobson

[57] ABSTRACT

A refractory material, which comprises 78–94 Wt % of $Al_2O_3$ and 15–6 Wt % of $B_2O_3$ to have $9Al_2O_3 \cdot 2B_2O_3$ phase and is highly resistant to spalling and corrosion by a $B_2O_3$-containing vapor, is produced by electrofusion of a powder mixture of $Al_2O_3$ and $B_2O_3$ with the addition of at least one alkali metal oxide or carbonate to adequately lower the electrical resistance of the material. The amount of the alkali metal compound is controlled so that the product may not contain more than 2 Wt % of $Li_2O$, $Na_2O$ and/or $K_2O$ thereby to accomplish the object without adversely affecting the spalling and corrosion resistance of the product.

12 Claims, 1 Drawing Figure

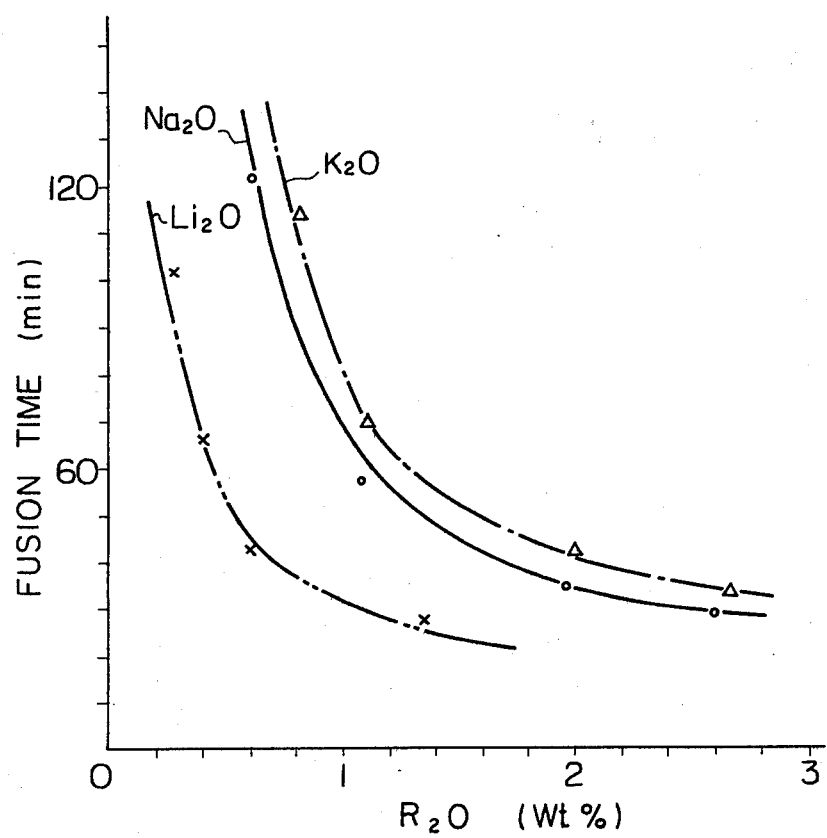

ELECTROFUSION METHOD OF PRODUCING BORON ALUMINUM OXIDE REFRACTORY

CROSS REFERENCE TO RELATED APPLICATION

This application is a continuation-in-part of application Ser. No. 886,109, filed Mar. 13, 1978, now abandoned.

BACKGROUND OF THE INVENTION

This invention relates to an electrofusion method of producing a corrosion-resistant refractory material which comprises as its major component a boron aluminum oxide phase.

In furnaces for melting glass compositions of the type characterized by comprising boric oxide $B_2O_3$ as an essential component and typified by E-glass which is in large use as glass fiber, usually use is made of mullite brick or silica brick as a refractory material with which the melt or vapor emitted by the melt comes into direct contact. A problem in this regard is that the refractory material suffers a significant corrosion due to the presence of boric oxide in the melt and vapor. This problem is not specific to glass industries but is encountered also in other fields where there is the need of treating $B_2O_3$-containing materials in the molten state.

U.S. Pat. No. 2,118,143 shows a refractory material composed fundamentally of about 65-90% of $Al_2O_3$ and about 35-10% $B_2O_3$ and containing a substantial proportion of crystalline boro-aluminate which is said to have the formula $3Al_2O_3.B_2O_3$.

Also, the existence of a crystalline bore-aluminate phase expressed by the formula $9Al_2O_3.2B_2O_3$ is known.

SUMMARY OF THE INVENTION

It is an object of the present invention to provide an electrofusion method of producing a boron aluminate refractory material, which method is easy to perform and gives a product sufficiently high in melting point, small in thermal expansion coefficient, high in resistance to spalling and, as a particular advantage, remarkably high in resistance to corrosion by contact with a molten or vaporized $B_2O_3$-containing material and deposits from the vapor.

According to the invention, a refractory material comprising a boron aluminum oxide phase expressed by the formula $9Al_2O_3.2B_2O_3$ is produced by melting a powder mixture of $Al_2O_3$, $B_2O_3$ and at least one alkali metal oxide or carbonate by making a current flow through the mixture in an electric furnace. The composition of the powder mixture is controlled such that the refractory material contains 78-94 Wt% of $Al_2O_3$, 6-15 Wt% of $B_2O_3$ and up to 2 Wt% of $R_2O$, where $R_2O$ represents at least one alkali metal oxide selected from $Li_2O$, $Na_2O$ and $K_2O$, conditioning that the sum of the percentages of $Al_2O_3$, $B_2O_3$ and $R_2O$ is not smaller than 95 Wt%, that the amount of $Li_2O$ in the refractory is not larger than 0.6 Wt.% and that the amount of $Na_2O$ in the refractory is not larger than 1.6 Wt%.

When the alkali metal is lithium, the amount of the lithium compound in the starting powder mixture should be at least 0.4 Wt%, calculated as $Li_2O$, of the sum of $Al_2O_3$ and $B_2O_3$. When the alkali metal is sodium, the amount of the sodium compound in the powder mixture should be at least 1.0 Wt%, calculated as $Na_2O$, of the sum of $Al_2O_3$ and $B_2O_3$. When the alkali metal is potassium, the amount of the potassium compound in the powder mixture should be at least 1.2 Wt%, calculated as $K_2O$, of the sum of $Al_2O_3$ and $B_2O_3$.

A primary feature of an electrofusion method according to the invention is the addition of a controlled amount of $R_2O$ or $R_2CO_3$ to a fundamental mixture of $Al_2O_3$ and $B_2O_3$. The addition of the alkali metal compound has the effect of adequately lowering the electrical resistance of the mixture and the resultant boron aluminate refractory. Therefore, fusion of the raw materials can be achieved easily and rapidly. The employment of a powder mixture composed as specified above is important to the production of a boron aluminate refractory excellent in refractoriness, spalling resistance and corrosion resistance.

A refractory material produced by a method according to the invention is useful in various fields. This material is especially suitable for use in the superstructure of a furnace to melt E-glass but of course is useful also for the construction of various apparatus for firing, melting or heat treatment of other $B_2O_3$-containing materials exemplified by glaze compositions and glass compositions such as C-glass, other than E-glass.

BRIEF DESCRIPTION OF THE DRAWING

The single FIGURE is a graph showing the effect of the addition of an alkali metal compound to an $Al_2O_3$-$B_2O_3$ mixture on the electrical conductivity of the material.

DESCRIPTION OF PREFERRED EMBODIMENTS

A feature of a refractory material produced in accordance with the invention is the presence of $9Al_2O_3.2B_2O_3$ phase therein but, in cases where a $B_2O_3$-containing material deposits on this refractory material from a vapor phase, the presence of $\alpha$-$Al_2O_3$ phase together with $9Al_2O_3.2B_2O_3$ phase is effective for enhancement of the corrosion resistance of the refractory material. Although the corrosion resistance is enhanced more and more as the proportion of $\alpha$-$Al_2O_3$ phase is increased, unlimited increase in the proportion of $\alpha$-$Al_2O_3$ results in that the refractory material tends to crack during use probably because of a change in its volume caused by reaction between the $\alpha$-$Al_2O_3$ phase and a $B_2O_3$ component of the vapor. Numerically, such cracking tendency of the refractory material appears when the weight ratio $\alpha$-$Al_2O_3/9Al_2O_3.2B_2O_3$ exceeds 1.22, meaning that the amount of $B_2O_3$ in the refractory material becomes less than 6% by weight. The lower limit, 6%, of the $B_2O_3$ content of the refractory material was fixed on this ground. A cracking tendency appears also when the refractory material contains an excessively large amount of $B_2O_3$. The upper limit, 15 Wt%, of the $B_2O_3$ content was fixed because a cracking tendency was recognized when the $B_2O_3$ content of the refractory material was made to exceed 15% while the $Al_2O_3$ content was kept at the lower limit, 78%.

The total amount of $Al_2O_3$ in the refractory material must be 78 Wt% at the smallest because otherwise there occurs an excessive increase in the amount of free $B_2O_3$ as a cause of cracking of the refractory material. However, the total amount of $Al_2O_3$ must not exceed 94 Wt% since the presence of more than 94% total $Al_2O_3$ means the presence of $\alpha$-$Al_2O_3$ phase in an excessively large proportion and hence leads to cracking of the refractory material from the above described reason.

As mentioned hereinbefore, the presence of $R_2O$ affords an adequate electrical conductivity to the material. In practice $Li_2O$, $Na_2O$ and $K_2O$ can serve as $R_2O$, either individually or in combinations. The total $R_2O$ content in the refractory material must not exceed 2 Wt% because the use of more than 2% $R_2O$ causes that a matrix glass phase occupies a relatively large part of the refractory material, resulting in lowering of the refractoriness and spalling resistance of the material. In the case of using $Li_2O$ alone as $R_2O$, it is necessary not to make the $R_2O(Li_2O)$ content more than 0.6 Wt% because the use of more than 0.6% $Li_2O$ (even though not more than 2%) possibly offers the aforementioned disadvantage. For the same reason the use of more than 1.6 Wt% $Na_2O$ should be avoided. The $R_2O$ content can be maximized to 2% in the case of using $K_2O$ alone or using a mixture of $K_2O$ and either one or both of $Li_2O$ and $Na_2O$ insofar as the $Li_2O$ content and $Na_2O$ content of the refractory material do not exceed 0.6% and 1.6%, respectively.

It is impermissible that the total amount of impurities in the refractory material is more than 5 Wt%: the sum of the percentages of $Al_2O_3$, $B_2O_3$ and $R_2O$ is required not to be smaller than 95%. Of course the smaller the impurity content the better the physical properties such as refractoriness and spalling resistance of the refractory material. In practice, however, it is difficult to completely remove impurities contained in raw materials and hence it is usual that the refractory material contains small amounts of impurities which are primarily $SiO_2$, $CaO$ and $MgO$. Although the presence of up to 5% impurities in total is permissible, the presence of more than 4 Wt% $SiO_2$ in the refractory material should be avoided because of the possibility of causing lowering of the refractoriness and spalling resistance.

In the present invention, commercially available alumina and boria (diboron trioxide) can be used as the fundamental materials for the boron aluminum oxide refractory.

For electrofusion as a method of producing a refractory material having a very tight structure, the electrical conductivity of a mixture of alumina and boric acid in due proportion to obtain $9Al_2O_3.2B_2O_3$ phase is rather insufficient compared with a mullite brick material or a $\beta$-alumina brick material. Accordingly there is a case where it is difficult to accomplish electrofusion of the $Al_2O_3$-$B_2O_3$ mixture in a furnace of a relatively small electrical capacity. This difficulty can be obviated by the introduction of an $R_2O$ component to the essential composition. In this case, at least one alkali metal compound which may be an oxide or a salt readily decomposable to oxide is added to the starting oxide mixture. Examples of suitable alkali metal compounds are lithium oxide, sodium carbonate (soda ash) and potassium carbonate. The electrical conductivity of $9Al_2O_3.2B_2O_3$ at 1200° C. is about $1.3 \times 10^{11}$ $\Omega$cm in the presence of no $R_2O$ component but becomes $5-13 \times 10^2$ $\Omega$cm when the oxide system contains 0.6 Wt% $Li_2O$. Nearly the same conductivity can be realized also when the oxide system contains 1.6 Wt% $Na_2O$ or 2.0 Wt% $K_2O$ in place of $Li_2O$.

A matrix glass phase exists in an $R_2O$-containing refractory material produced by the invention as described hereinbefore. It was confirmed that, when $K_2O$ alone was used as the $R_2O$ component, the matrix glass phase had a composition close to an equimolar $K_2O$-$B_2O_3$ system and comprised only about 5 Wt% or less $Al_2O_3$. Accordingly a portion of the $B_2O_3$ component (nearly the same amount by mole as the introduced $K_2O$) could not participate in forming $9Al_2O_3.2B_2O_3$ phase. To realize an intended amount of $9Al_2O_3.2B_2O_3$ phase in the refractory material, therefore, there is the need of increasing the amount of $B_2O_3$ in the starting oxide mixture by a quantity of $B_2O_3$ serving as a constituent of the $K_2O$-$B_2O_3$-$Al_2O_3$ matrix glass phase in the product.

A matric glass phase of a fundamentally similar structure was observed also when either $Li_2O$ or $Na_2O$ was used in place of $K_2O$. In a matrix glass phase formed by the use of 0.6 Wt% $Li_2O$, the molar ratio of $Li_2O$ to $B_2O_3$ was from about 0.7 to about 2, and a matrix glass phase formed by the use of 1.6 Wt% $Na_2O$ comprised $Na_2O$ and $B_2O_3$ at a molar ratio of about 1. Accordingly, there is the need of using an increased amount of $B_2O_3$ irrespectively of the constituent of the $R_2O$ component so as to make up for the shortage attributable to the formation of a matrix glass phase.

$9Al_2O_3.2B_2O_3$ is a stable crystal phase: after formation it undergoes no or little change either through hydration or by the influence of the action of $R_2O$ or impurities such as $SiO_2$ on a portion of the starting $B_2O_3$ to form a matrix glass phase of the above described sort. However, $9Al_2O_3.2B_2O_3$ phase in an electrocast refractory material of the type herein concerned with undergoes a certain change, probably through hydration, which leads to a cracking tendency of the casting when the refractory material comprises excess $B_2O_3$ as a separate phase in regard to the formation of $9Al_2O_3.2B_2O_3$. A similar phenomenon occurs also in a case where coexists a matrix glass phase in which the proportion of $B_2O_3$ to $K_2O$, $Li_2O$ or $Na_2O$ is larger than the above described value. When, for example, the electrocast refractory consists essentially of $Al_2O_3$ and $B_2O_3$, meaning that other components are 0.1 Wt% or less in total, an increase in the weight ratio $B_2O_3/Al_2O_3$ beyond 14/86 (by analysis of the cast refractory) causes cracking of the cast refractory probably due to the occurrence of a hydration reaction expressed by $B_2O_3 + 3H_2O \rightarrow 2H_3BO_3$. When the cast refractory contains 2% $K_2O$ (permissible maximum amount of $R_2O$), about 4% $SiO_2$ and about 1% in total of other impurities, the refractory exhibits no appreciable change such as cracking unless its total $B_2O_3$ content (by analysis) exceeds 15%.

As will be understood from the foregoing description, the specified numerical ranges for the amounts of the respective components of the refractory material should be taken as analytical values, not as indicative of the structure of the refractory.

The electrofusion of the aforementioned starting materials is accomplished usually at temperatures between about 1980° C. and about 2200° C. The pouring temperature at the casting of the resultant melt is preferably in the range from about 1880° C. to about 2050° C. It is desirable to separate the casting from the mold after the lapse of about 5 to 10 minutes from the completion of pouring. From the viewpoint of minimizing the quantity of defective castings, it is preferable to accomplish cooling of the casting very slowly, so as to take two or three days, by burying the casting in a large quantity of aluminum powder.

EXPERIMENT

This experiment is a part of extensive experimental work we have carried out to determine an optimum range of the amount of the alkali metal compound in the starting powder mixture in a method of the invention.

In this experiment, $Li_2O$, $Na_2CO_3$ or $K_2CO_3$ was added to a powder mixture of $Al_2O_3$ (84 parts by weight) and $B_2O_3$ (16 parts by weight) in various amounts and mixed thoroughly.

Each of the resultant batches (each weighing 50 kg) was charged into an electric furnace of the pot type (capacity: 120 liters) in which vertical carbon electrodes were inserted into the powder mixture. Fusion of the powder mixture was accomplished by the application of a voltage of 300 V (maximum) to the electrodes to produce a maximum current intensity of 800 A, meaning a maximum electric energy of 240 KVA. Since it was quite difficult to accurately detect changes in the resistivity of the material, the amount of time needed for complete fusion of each batch was measured as an indication of the resistivity of the fused material.

The FIGURE on the accompanying drawing shows the result of this experiment. On the abscissa, the amount of the alkali metal compound added to the mixture of $Al_2O_3$ and $B_2O_3$ is indicated in percent of the total weight of $Al_2O_3$ and $B_2O_3$, calculating $Na_2CO_3$ and $K_2CO_3$ respectively in $Na_2O$ and $K_2O$ equivalents. In the case of $Li_2O$, the fusion time shortened to about half when the amount of $Li_2O$ was made to reach 0.4 Wt%. Such a magnitude of shortening of the fusion time can be judged to be a practically appreciable effect of the addition of $Li_2O$. The minimum amount of $LiO_2$ to be added was determined in consideration of experimental results including the one presented in this FIGURE. Similarly, the FIGURE demonstrates that an appreciable effect can be gained either when the amount of $Na_2O$ reaches 1.0 Wt% or when the amount of $K_2O$ reaches 1.2 Wt%. Excellent properties of a refractory material produced by the invention, namely, high refractoriness, high resistance to spalling and high resistance to corrosion by contact with a vaporized $B_2O_3$-containing material as typified by borosilicate glass, deposits from the vapor phase or melt which emits the vapor, will be demonstrated together with controllability of its porosity and electrical resistance by the following example.

EXAMPLE

Bayer process alumina and diboron trioxide were used as essential raw materials. These oxides were mixed well with selective addition of soda ash, potassium carbonate, lithium oxide, silica and/or lime so as to give a powdery mixture appropriate for the production of a refractory material of an intended composition. In this example six differently composed batches of such powdery mixture were prepared, and each of these batches was melted in an electric furnace. The fusion was accomplished in 1 to 1.5 hr at temperatures between 1980° C. and 2200° C., and every melt was cast into the same shape by an ordinary casting method, followed by cooling.

Table I-(1) represents analytical values for six kinds of cast refractories, Nos. 1–6, produced in this example respectively from the six batches of raw material mixtures. As can be seen from the analytical values the refractories Nos. 2–5 were in accordance with the invention but Nos. 1 and 6 were not. Table I-(2) presents three different kinds of refractories, Nos. 7–9, which were produced by the method employed in this Example but in their composition were not in accordance with the invention.

The structure and refractory characteristics (experimental results) of these nine kinds of refractories are presented in Table I-(1) for Nos. 1–6 and in Table I (2) for Nos. 7–9.

TABLE I

| Sample | No. 1 | No. 2 | No. 3 | No. 4 | No. 5 | No. 6 | No. 7 | No. 8 | No. 9 |
|---|---|---|---|---|---|---|---|---|---|
| $Al_2O_3$(Wt%) | 86.43 | 84.02 | 85.31 | 83.01 | 78.19 | 90.98 | 82.07 | 94.06 | 73.21 |
| $B_2O_3$(wt%) | 13.14 | 14.40 | 14.03 | 14.97 | 14.88 | 6.47 | 15.88 | 5.74 | 17.84 |
| $Li_2O$(Wt%) | — | — | 0.55 | 0.42 | 0.28 | 0.20 | — | — | 0.57 |
| $Na_2O$(Wt%) | 0.01 | 1.20 | — | 0.84 | 0.49 | — | — | — | 1.12 |
| $K_2O$(Wt%) | — | — | — | 0.30 | 0.77 | — | 1.75 | — | 1.54 |
| $SiO_2$(Wt%) | 0.03 | 0.03 | 0.03 | 0.03 | 3.20 | 0.84 | 0.04 | 0.03 | 4.40 |
| CaO(Wt%) | — | 0.01 | — | 0.01 | 0.84 | 0.41 | 0.01 | — | 0.91 |
| MgO(Wt%) | — | — | — | — | 0.90 | 0.30 | — | — | 0.37 |
| Crystal Phase | very much | very much | very much | much | much | very much | very much | very much | considerably much |
| Matrix Glass Phase | very little | very little | very little | considerable | much | very little | considerably much | very little | very much |
| Refractoriness (SK, pyrometric cone equivalent) | >38 | >38 | >38 | 36 | 34 | >38 | 37 | >38 | 31 |
| Porosity(%) | 7.3 | 4.0 | 4.5 | 4.7 | 0.7 | 4.8 | 1.48 | 7.0 | 7.3 |
| Bulk Density | 2.47 | 2.82 | 2.70 | 2.67 | 3.16 | 3.04 | 2.90 | 2.82 | 2.58 |
| Spalling Resistance[a](cycles) | 14 | 9 | 10 | 7 | 5 | 5 | 4 | 2 | 2 |
| Corrosion Resistance (A)[b] (reaction) | no | no | no | no | no | a little | no | yes | yes |
| Corrosion Resistance (B)[c] (mm) | 4.0 | 4.6 | 4.0 | 3.2 | 3.5 | 2.0 | 8.0 | 3.0 | 9.0 |
| Initial Cracks[d] | none | none | none | a few | a few | none | considerably many | considerably many | considerably many |
| Later Cracking[e] | no | no | no | no | no | no | considerable | no | considerable |
| Electrical | very | | | | very | relatively | | | very |

TABLE I-continued

| Sample | No. 1 | No. 2 | No. 3 | No. 4 | No. 5 | No. 6 | No. 7 | No. 8 | No. 9 |
|---|---|---|---|---|---|---|---|---|---|
| Resistance | high | low | low | low | low | low | low | high | low |

Notes:
[a] Spalling resistance

50 × 50 × 50 mm cubical specimen of the refractory was kept first in a furnace maintained at 1400° C. for 30 min and then at room temperature for 30 min. The heating-cooling was cycled. The numerical value indicates the number of cycles effected until the appearance of a crack of at least 1 mm in maximum length.

[b] Corrosion Resistance (A)

A test based on the crucible cover vapor test of A. S. T. M., using a crucible of dense alumina and a $B_2O_3$ glass as the corrosive. The test was continued for 24 hr at 1400° C., and the result is presented as the appreciableness of reaction product formed by the reaction between the refractory sample and the vapor of the molten $B_2O_3$ glass.

[c] Corrosion Resistance (B)

The refractory sample was kept in contact with a 1400° C. melt of E-glass for 240 hr. The numerical value indicates the depth of corrosion in the sample.

[d] Initial Cracks

The result is presented based on the count of cracks observed immediately after production of the refractory.

[e] Later Cracking

The refractory sample was left to stand outdoor for 62 days from the date of production. The result is presented based on the count of cracks appeared during this test period.

What is claimed is:

1. An electrofusion method of producing a refractory material comprising a boron aluminum oxide phase expressed by the formula $9Al_2O_3.2B_2O_3$, the method comprising the steps of:

preparing a powder mixture of aluminum oxide, diboron trioxide and at least one alkali metal compound selected from the group consisting of oxides and carbonates of lithium the amount of said lithium compound calculated in terms of $Li_2O$ being at least 0.4 Wt% of the sum of $Al_2O_3$ and $B_2O_3$ in said mixture; and melting said mixture in an electric furnace by making a current flow through said mixture;

the composition of said mixture being controlled such that the product of the melting step contains 78–94 Wt% of $Al_2O_3$, 6–15 Wt% of $B_2O_3$ and up to 2 Wt% of $R_2O$ such that the sum of $Al_2O_3$, $B_2O_3$ and $R_2O$ is not smaller than 95 Wt%, where $R_2O$ represents at least one alkali metal oxide selected from the group consisting of $Li_2O$, $Na_2O$ and $K_2O$, the amount of $Li_2O$ in said product being not larger than 0.6 Wt%, the amount of $Na_2O$ in said product being not larger than 1.6 Wt%.

2. A method according to claim 1, wherein the melting step is performed such that the melted mixture reaches a temperature in the range from about 1980° C. to about 2200° C.

3. A method according to claim 1, wherein said mixture is composed such that said product comprises $\alpha$-$Al_2O_3$ together with said boron aluminum oxide phase.

4. A method according to claim 2, wherein the weight ratio of $\alpha$-$Al_2O_3$ phase to said boron aluminum oxide phase is not greater than 1.22.

5. An electrofusion method of producing a refractory material comprising a boron aluminum oxide phase expressed by the formula $9Al_2O_3.2B_2O_3$, the method comprising the steps of:

preparing a powder mixture of aluminum oxide, diboron trioxide and at least one alkali metal compound selected from the group consisting of oxides and carbonates of sodium, the amount of said sodium compound calculated in terms of $Na_2O$ being at least 1.0 Wt% of the sum of $Al_2O_3$ and $B_2O_3$ in said mixture; and melting said mixture in an electric furnace by making a current flow through said mixture;

the composition of said mixture being controlled such that the product of the melting step contains 78–94 Wt% of $Al_2O_3$, 6–15 Wt% of $B_2O_3$ and up to 2 Wt% of $R_2O$ such that the sum of $Al_2O_3$, $B_2O_3$ and $R_2O$ is not smaller than 95 Wt%, where $R_2O$ represents at least one alkali metal oxide selected from the group consisting of $Li_2O$, $Na_2O$ and $K_2O$, the amount of $Li_2O$ in said product being not larger than 0.6 Wt%, the amount of $Na_2O$ in said product being not larger than 1.6 Wt%.

6. A method according to claim 5, wherein the melting step is performed such that the melted mixture reaches a temperature in the range from about 1980° C. to about 2200° C.

7. A method according to claim 5, wherein said mixture is composed such that said product comprises $\alpha$-$Al_2O_3$ together with said boron aluminum oxide phase.

8. A method according to claim 6, wherein the weight ratio of $\alpha$-$Al_2O_3$ phase to said boron aluminum oxide phase is not greater than 1.22.

9. An electrofusion method of producing a refractory material comprising a boron aluminum oxide phase expressed by the formula $9Al_2O_3.2B_2O_3$, the method comprising the steps of:

preparing a powder mixture of aluminum oxide, diboron trioxide and at least one alkali metal compound selected from the group consisting of oxides and carbonates of potassium, the amount of said potassium compound calculated in terms of $K_2O$ being at least 1.2 Wt% of the sum of $Al_2O_3$ and $B_2O_3$ in said mixture; and melting said mixture in an electric furnace by making a current flow through said mixture;

the composition of said mixture being controlled such that the product of the melting step contains 78–94 Wt% of $Al_2O_3$, 6–15 Wt% of $B_2O_3$ and up to 2 Wt% of $R_2O$ such that the sum of $Al_2O_3$, $B_2O_3$ and $R_2O$ is not smaller than 95 Wt%, where $R_2O$ represents at least one alkali metal oxide selected from the group consisting of $Li_2O$, $Na_2O$ and $K_2O$, the amount of $Li_2O$ in said product being not larger than 0.6 Wt%, the amount of $Na_2O$ in said product being not larger than 1.6 Wt%.

10. A method according to claim 9, wherein the melting step is performed such that the melted mixture reaches a temperature in the range from about 1980° C. to about 2200° C.

11. A method according to claim 9, wherein said mixture is composed such that said product comprises $\alpha$-$Al_2O_3$ together with said boron aluminum oxide phase.

12. A method according to claim 10, wherein the weight ratio of $\alpha$-$Al_2O_3$ phase to said boron aluminum oxide phase is not greater than 1.22.

* * * * *

UNITED STATES PATENT AND TRADEMARK OFFICE
CERTIFICATE OF CORRECTION

PATENT NO. : 4,226,629
DATED : October 7, 1980
INVENTOR(S) : HEIZI TABUCHI ET AL It is certified that error appears in the above—identified patent and that said Letters Patent is hereby corrected as shown below:

On the title page, insert

-- (30) Foreign Application Priority Data

March 17, 1977   Japan................52-28659 --

Signed and Sealed this

Fourteenth Day of September 1982

[SEAL]

Attest:

GERALD J. MOSSINGHOFF

Attesting Officer    Commissioner of Patents and Trademarks